United States Patent
Duxbury et al.

(10) Patent No.: US 7,467,069 B2
(45) Date of Patent: Dec. 16, 2008

(54) METHOD AND APPARATUS FOR EXTRACTING INFORMATION FROM AN ARRAY OF HAZARDOUS MATERIAL SENSORS

(75) Inventors: Guy Duxbury, Nepean (CA); Rolf Meier, Carp (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 11/305,979

(22) Filed: Dec. 19, 2005

(65) Prior Publication Data
US 2007/0143079 A1    Jun. 21, 2007

(51) Int. Cl.
*G06F 15/00* (2006.01)

(52) U.S. Cl. .................. 702/189; 702/30; 702/179

(58) Field of Classification Search .......... 702/22–32, 702/158, 159, 179, 181, 188, 189, 194, 199; 340/521–523, 600, 601, 632; 250/339.12, 250/339.13; 436/55; 422/83, 88–92
See application file for complete search history.

(56) References Cited

U.S. PATENT DOCUMENTS

| | | | | |
|---|---|---|---|---|
| 4,765,244 | A | * | 8/1988 | Spector et al. .............. 102/213 |
| 7,061,388 | B1 | * | 6/2006 | Maurer et al. ............... 340/632 |
| 2003/0093187 | A1 | * | 5/2003 | Walker .......................... 701/1 |
| 2005/0156734 | A1 | * | 7/2005 | Zerwekh et al. .......... 340/539.1 |
| 2005/0248454 | A1 | * | 11/2005 | Hanson et al. ......... 340/539.26 |
| 2006/0087439 | A1 | * | 4/2006 | Tolliver .................... 340/573.1 |

OTHER PUBLICATIONS

C. Allen, et al., *Extending Subnoise-level Signal Recovery in Radar Applications*, ADC 2005, (6 pages).

* cited by examiner

*Primary Examiner*—Manuel L Barbee
(74) *Attorney, Agent, or Firm*—Anderson Gorecki & Manaras LLP

(57) ABSTRACT

Information may be extracted from an array of relatively low sensitivity hazardous material sensors deployed, for example within a population center, by collecting identification information, such as video data, RFID data, proximity data, and IR data along with the hazardous material sensor reading. The identification information may then be used to identify objects in the vicinity of the hazardous material sensor at the time the reading was taken. By using identification data to identify an object, and then correlating sensor data readings for that object with other sensor data readings for the same object, as identified using previously collected identification information, a statistically more significant reading may be obtained for that particular object than would be obtainable by any one particular hazardous material sensor. Optionally the proximity of the object to the sensors may be used to weight the readings from the sensors.

11 Claims, 4 Drawing Sheets

Sensor = S1
Time= T1

Sensor = S2
Time= T2

Sensor = S5
Time= T3

Sensor = S7
Time= T4

Correlated
Data

METHOD AND APPARATUS FOR EXTRACTING INFORMATION FROM AN ARRAY OF HAZARDOUS MATERIAL SENSORS

BACKGROUND OF THE INVENTION

1. Field of the Invention

The present invention relates to hazardous material sensors and, more particularly, to a method and apparatus for extracting information from an array of hazardous material sensors.

2. Description of the Related Art

Hazardous materials may be used in many ways to threaten the health and/or welfare of a civilian population. For example, a nuclear or biological device may be brought to a population center and detonated thereby causing catastrophic loss in terms of life and assets. To detect the presence of nuclear and/or biological materials, it is possible to deploy sensors designed to detect the presence of such materials. The sensors may be mobile and transported around and between cities to search for pockets of increased readings characteristic of the presence of the hazardous material. Alternatively, the sensors may be deployed in an array within a population center such as a city or town to sense if hazardous materials are being transported in and through the population center.

Existing hazardous material sensors are able to detect many different types of hazardous materials. Generally, to increase sensitivity, the sensors are required to be increased in size. For example, a radiation sensor has a sensitivity roughly proportional to its volume, and must be very large to sense a dirty bomb at 30 feet. In addition, sensors exhibiting higher sensitivity to the particular hazardous material of interest generally are more costly. The combination of the increased size and increased cost makes high sensitivity sensors more difficult to deploy discretely and ubiquitously in a population center.

Accordingly, it would be better from a cost and deployment perspective if the sensors to be deployed were able to be made relatively small and inexpensive. Unfortunately, due to the relatively high background noise level and the concomitant low signal to noise ratio experienced by many small low cost sensors, small sensors generally are considered unsuitable for use in hazardous material sensing networks.

One known way of extracting statistically significant data from an array of low gain sensors is through the use of correlation. Specifically, as an object moves through a linear array of sensors, readings may be taken from the sensors when the object is in close proximity to the sensor. By aggregating the readings from all the sensors it is possible to reduce the noise level to enable the signal to emerge and, hence, to discern the presence of hazardous material on the object that is passing through the sensor array, even where any one of the individual sensors would not be able to detect the hazardous material on its own.

While correlation works well when an object travels along a known trajectory past a set of sensors at predictable times, persons carrying hazardous materials in a population center may be expected to travel erratically and, hence, not pass the sensors in the population center at predictable times or in a predictable order. Accordingly, it would be advantageous to provide a new way of extracting information from an array of hazardous material sensors deployed, for example, in a population center.

SUMMARY OF THE INVENTION

A method and apparatus for extracting information from an array of hazardous material sensors enables relatively low sensitivity hazardous material sensors to be used together with positional correlation information to extract statistically more significant information from the array than may be extracted using any single sensor. According to an embodiment of the invention, identification information such as video data, RFID data, proximity data, and IR data, may be used to identify and track objects moving in and through an array of hazardous material sensors. The proximity of the objects may be used to weight the readings on the sensors, and the readings of multiple sensors may be ordered over time using the identification information to associate an object with a set of sensor readings. Ordering the readings using the identification information enables the readings to be correlated as the object moves past sensors in the sensor array deployed within a population center. By using identification data to identify an object, and then correlating sensor data readings for that object with other sensor data readings for the same object as identified using the identification information, a statistically more significant reading may be obtained for that particular object than would be obtainable by any one particular hazardous material sensor.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
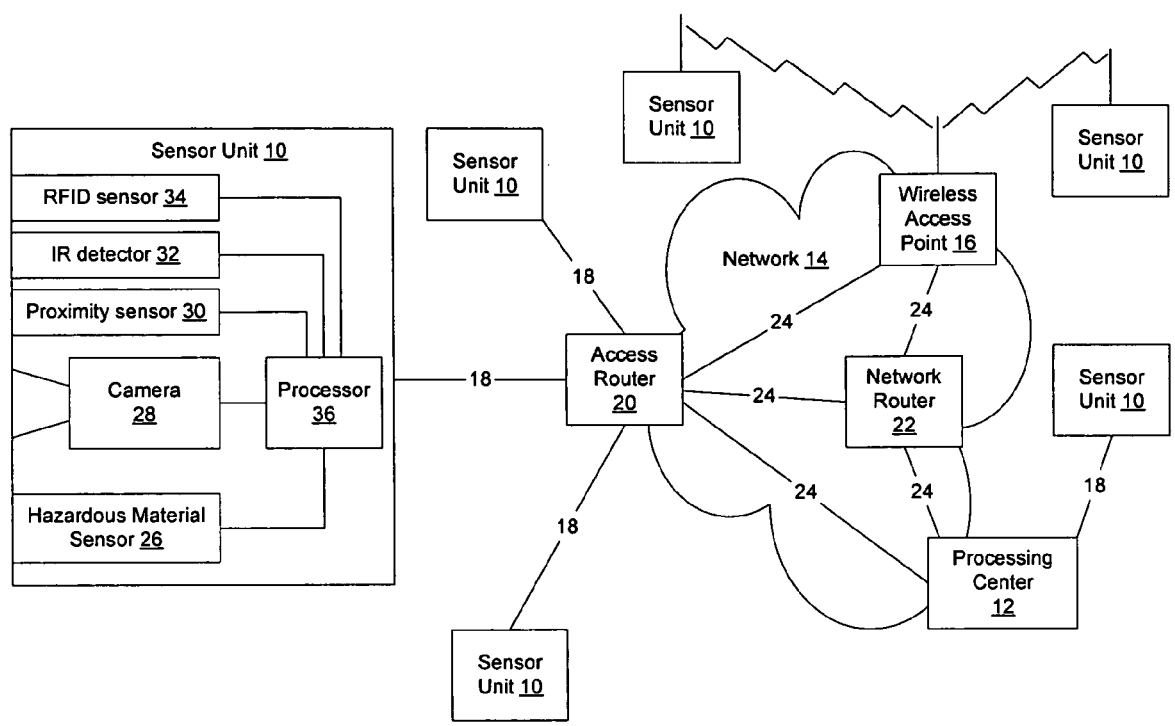
FIG. 1 is a functional block diagram of an example of a plurality of networked sensor units interconnected with a processing center according to an embodiment of the invention.

FIG. 1 illustrates an example of a plurality of networked sensor units interconnected with a processing center according to an embodiment of the invention. As shown in FIG. 1, sensor units 10 may be connected with a processing center 12 across a communication network 14. The sensor units may be connected wirelessly to a wireless access point 16 on the communication network 14 or may be connected via wired links 18 to an access router 20 or another type of network element. Communications received by the wireless access point 16 or the access router 20 may be communicated through the communication network 14 in standard fashion, such as by being routed through a network router 22 or may be forwarded directly to the processing center, for example over wired or wireless links 24. Optionally, as shown in FIG. 1, the sensor units may be configured to be connected directly to the processing center as well. The invention is not limited by the particular manner in which signals get from the sensor units to the processing center, as many different types of conventional networking technology may be used to convey the signals from the sensor units to the processing center.

For simplicity, the following description will focus on an embodiment in which a single processing center is used to process signals from a plurality of sensor units to correlate signals from multiple sensor units with a given object or set of objects. The invention is not limited in this manner as multiple processing centers collaboratively working to process signals from the sensor units may be used as well.

FIG. 1 also shows one of the sensor units in greater detail, to illustrate several of the features that may be provided in connection with the sensor unit. The invention is not limited to the particular implementation shown in FIG. 1, as numerous different features may be provided in connection with the particular sensor units depending on the manner in which the sensor units are to operate in connection with the hazardous material sensing system.

In the embodiment shown in FIG. 1, the sensor unit bas a hazardous material sensor 26 and one or more identification devices that are configured to be able to collect identification information that may be used to identify objects in the vicinity of the sensor unit. For example, in the embodiment illustrated in FIG. 1, the sensor unit includes a camera 28 configured to provide video images of objects in the vicinity of the sensor unit, a proximity sensor 30 configured to determine how far away an object is from the sensor, and an IR detector 32 configured to detect thermal objects to provide thermal images and/or thermal signatures of objects in the vicinity of the sensor unit. The sensor unit may also include an RFID (Radio Frequency Identification) sensor 34 configured to sense the presence of any RFID tags associated with objects in the vicinity of the sensor. Additional identification devices may be used as well and the invention is not limited to an embodiment that uses these particular identification devices, this combination of identification devices, or only these identification devices. Similarly, although only one hazardous material sensor is shown in the example of F*ig*. 1, the sensor unit may have multiple hazardous material sensors configured to detect different types of hazardous materials, and the invention is not limited by the particular type of hazardous material sensor used to implement an embodiment of the invention. Examples of hazardous material sensors include nuclear radiation sensors, biological material sensors, and other types of sensors.

Data from the identification devices 28-34 is input to a processor 36 along with data from the hazardous material sensor 26 and sent to the processing center 12 over the network 14. Alternatively, the data may be sent separately on demand or automatically periodically. The data from the identification devices will be used by the processing center to identify particular objects so that readings from the hazardous material sensors in various sensor units may be correlated as the objects move throughout an array of deployed sensor units. The ability to identify the objects enables correlation techniques to be used without requiring the objects to be in the vicinity of a particular sensor at a predictable point in time. Thus, correlation may be used to increase the sensitivity of the sensor array to provide a better determination as to whether a particular object is likely to possess the hazardous materials.

Figure 2:
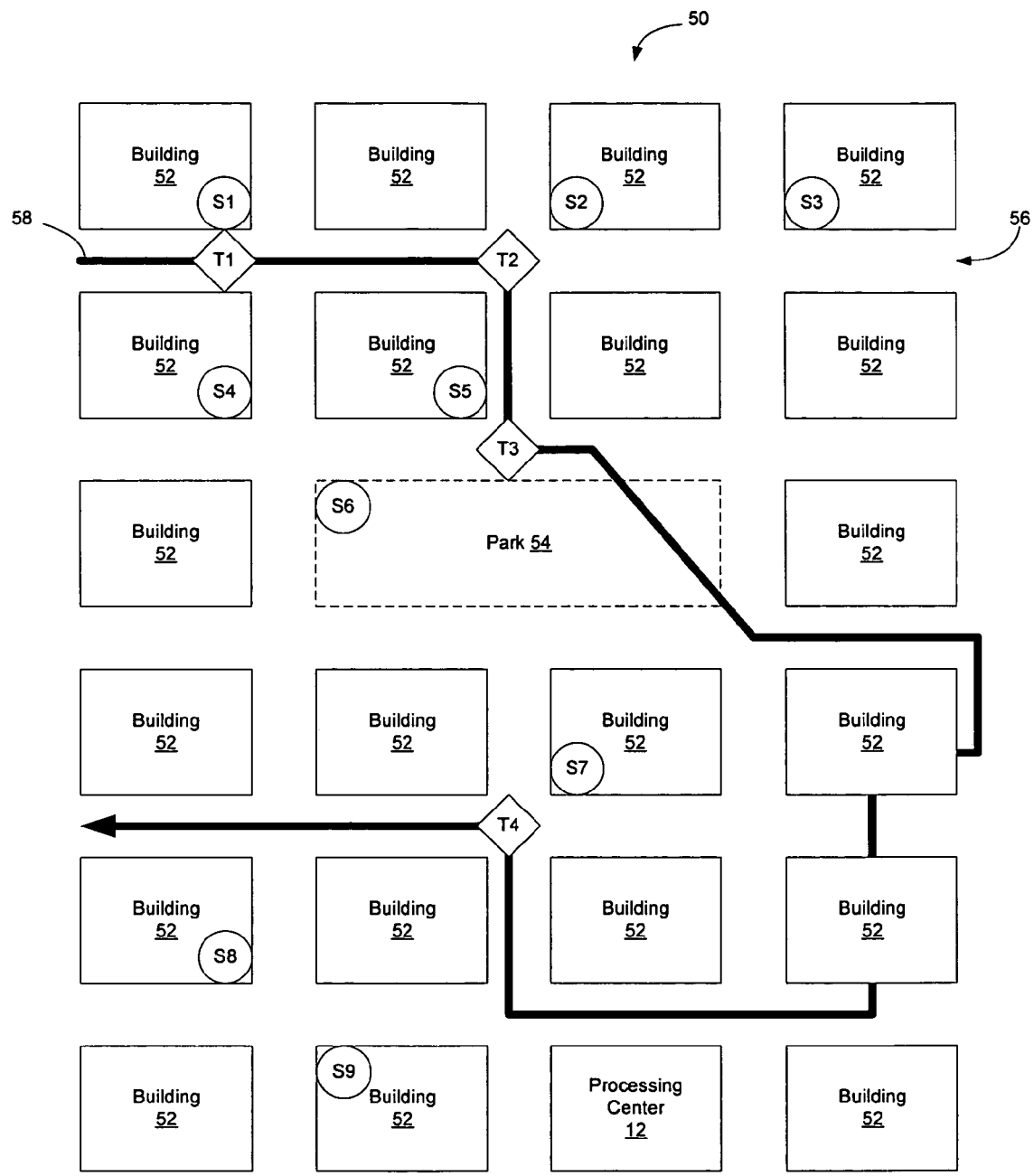
FIG. 2 is a functional block diagram illustrating an array of sensor units deployed within an urban population center.

FIG. 2 illustrates an array of sensor units (S1-S9) deployed in an ad-hoc or other manner within an urban population center 50. The urban population center may include one or more buildings 52, parks 54, and streets 56. Sensor units may be deployed on the outside of the buildings, on lamp posts, in man-holes within the streets, or in other locations. The invention is not limited by the manner in which the sensor units are deployed, as numerous ways of deploying the sensor units may be used.

As an object moves through the urban population center, the object may take a circuitous path 58, passing sensors in any particular order, occasionally stopping, and occasionally exiting the sensor network. To enable sensor readings from the hazardous material sensors to be correlated with particular objects moving within the population center, one or more identification devices deployed along with the sensors will sense characteristics of objects in the vicinity of the hazardous material sensor when the sensor takes a sensor reading. The data collected by the identification devices may then be used to identify the objects that may have contributed to the signal read by the hazardous material sensor, so that the readings of the sensor may be combined with other sensor readings for the same identified object.

As an object passes one or more of the sensors units, the sensor units will take a reading using the hazardous material sensor 26 and feed the identification information and hazardous material sensor reading back to the processing center 12. The processing center may be in the urban population center or may be located hundreds or more miles away. The invention is not limited to any particular location of the processing center. By processing the identification information from the identification device(s), the processing center can assign an identity to the object. Using this object identity, the processing center can retrieve hazardous material sensor readings from previous times when the object was able to be identified, and add the new sensor reading to the previous sensor readings. Over time, using standard correlation techniques, the sensor readings will enable non-standard sensor readings to emerge so that higher resolution may be provided from the array of sensors than would be available from any one hazardous material sensor.

Figure 3:
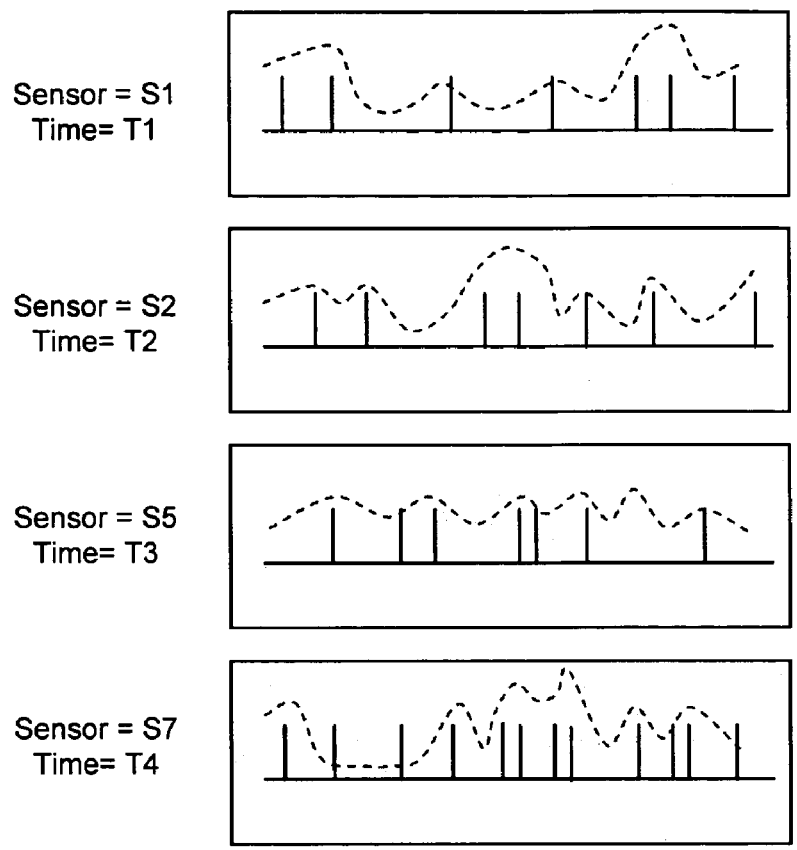
FIG. 3 is a set of example sensor readings for a particular object as determined by identification information that may be collected by the processing center according to an embodiment of the invention.

FIG. 3 shows several example sensor readings that may be taken by sensors in the hypothetical example shown in FIG. 2. Specifically, assume that an object is moving along the path 58 and is at the location within the population center indicated by the diamonds at random times T1-T4. At time T1, the object will be adjacent sensor unit S1 and sensor unit S1 will collect identification information, using one or more of the identification devices associated with the sensor unit, and a hazardous material sensor reading. The identification information and sensor reading will be passed back to the processing center 12 and stored in a database. Additional information about the processing center will be provided below. The object identification record, since only one sensor reading has been taken for that object, will have only the first sensor reading as shown in the top panel of FIG. 3.

As the object moves through the sensor array in the population center, the object will pass other sensors. For example, at time T2 the object will pass sensor unit S2, at time T3 the object will pass sensor unit S5, and at time T4 the object will pass sensor unit S7. In each instance, as the object passes a sensor unit, the sensor unit will collect both identification information and a hazardous material sensor reading. The processing center will use the identification information to determine the identity of the object, and will use this identity information to key into a database to correlate the new sensor reading with old sensor readings for the same object.

Figure 4:
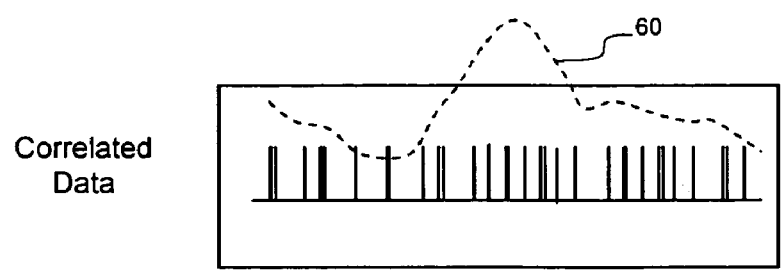
FIG. 4 is an example of a correlated sensor reading derived from the example sensor readings of FIG. 3 illustrating the manner in which sensor readings may be correlated according to an embodiment of the invention.

FIG. 4 illustrates an example of correlated data that may be created from the sensor readings of the multiple sensors as the object moves through the population center. As shown in FIG. 4, although each of the individual sensors did not register an increase in signal significant enough to rise above the background noise level, when the signals from the four sensors S1, S2, S5, and S7 (shown in FIG. 3) are added together or otherwise combined, the signal level 60 shows a marked increase above the noise level associated for that particular object. Thus, the correlated signal 60 may be used to detect the presence of hazardous materials where any individual sensor may not have been able to detect the hazardous material.

Each of the individual sensor units may, of course, also provide a positive reading where, for example, the object passes sufficiently close to the sensor unit to enable the hazardous material sensor to detect with sufficient accuracy the presence of hazardous material. The invention is not limited, therefore, to a system that only uses correlation techniques, as standard sensing techniques may be used in connection with the correlation techniques discussed herein as well. Advantageously, where a hazardous material sensor reports a positive sensor reading, the identification information from the sensor unit may be used to provide information to the police or other responders to provide the emergency personnel with characteristics information such as what the object looks like. Additionally, as that object then passes other sensor units, updates may be provided to the police as to the direction and current location of the object within the population center.

Figure 5:
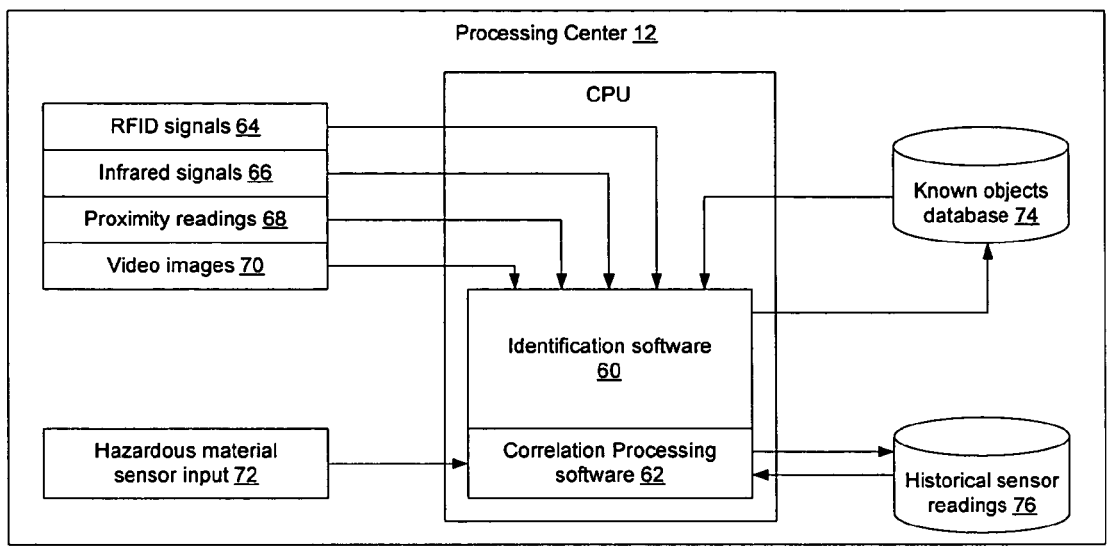
FIG. 5 is a functional block diagram of a processing center according to an embodiment of the invention.

FIG. 5 illustrates an embodiment of a processing center according to an embodiment of the invention. As shown in FIG. 5, the processing center 12 has a CPU configured to execute identification software 60 and correlation processing software 62. The identification software takes input from one or more of the identification devices and creates an object identity. For example, in the example shown in FIG. 5, the processing module receives as an input RFID signals 64 from the RFID sensor 34, IR signals 66 from the IR detector 32, proximity readings 68 from the proximity sensor 30, and/or video images 70 from the camera 28.

Using the input identification information, the identification module 60 characterizes the identification information to look for characteristic features and uses the characteristic features to key into a known objects database 74 to determine the identity of the object. For example, conventional software is available that is able to recognize a person based on a photograph of the person's face, and is able to identify the person from a group of other persons based on the characteristic features of the person's face. If the identification information provided to the identification module includes a video image of the person's face, video recognition software may use the video image to characterize the person's face and key into a known objects database to determine an identity of the person. The person's identity may be an actual identity record such as if the database is integrated with a governmental identity database, or may simply be a way in which the processing center keeps track of different objects. For example, each person and other object of interest may be assigned an identification number by the processing center that may be used to collect readings from multiple sensors so that readings may be correlated.

Once the object has been identified, the identification will be used to collect other hazardous material sensor readings for the object from a historical sensor readings database 76. For example, if a fifth reading was taken for the object traveling through the population center of FIG. 2, the fifth reading may be added to the other four readings shown in the example of FIG. 3. The historical sensor readings database 76 may store all of the sensor readings for a given object identity, or a correlation may be built up over time and only the correlated data may be stored by the processing center in the historical sensor readings database. The invention is not limited to a particular manner in which the data is stored in the historical sensor readings database. Although two databases are illustrated in FIG. 5, the invention is not limited in this manner as a single unified database may be used as well.

Regardless of whether the historical sensor readings database 76 stores raw hazardous material sensor readings, a correlation of previous hazardous material sensor readings, or both, information from previous hazardous material sensor readings will be collected for the identified object and added together or otherwise combined to form an updated correlated reading for the object. The updated correlated reading will be thresholded or otherwise processed to determine if the updated correlated reading provides an indication that the object is likely to be associated with hazardous materials and, if so, an alarm may be raised. If the updated correlated reading does not indicate the likelihood of the presence of hazardous materials, the sensor information may be stored along with the information from previous hazardous material sensor readings may in the historical sensor readings database 76 so that it may be used in connection with subsequent sensor readings.

By using the identity information provided by the identification devices to determine an identity of an object moving through the population center, it becomes possible to correlate hazardous material sensor readings with a particular object regardless of the path the object takes through the sensor array, and regardless of whether the object stops for a period of time, exits the sensor array, or otherwise moves into and out of the sensor array. Accordingly, the data may be ordered using the identification information to enable standard correlation techniques to be used to extract information from the sensor array that may otherwise not be possible to detect from the readings of only one or a small number of sensors.

Many variations may be used in connection with embodiments of the invention. For example, the proximity sensor 30 may be used to weight the readings of the hazardous material sensor. Similarly, the identification information may be used to generate a probability that a particular object is present in the vicinity rather than an absolute. The probability may then be used in the correlation to weight the hazardous material sensor readings or may be used to ignore hazardous material sensor readings where the probability is not sufficiently statistically significant to justify use of the hazardous material sensor reading in connection with other previous sensor readings for that object. The invention is thus not limited to the particular example provided herein as many additional modifications may be implemented as well without departing from the invention.

It should be understood that all functional statements made herein describing the functions to be performed by the methods of the invention may be performed by software programs implemented utilizing subroutines and other programming techniques known to those of ordinary skill in the art.

The functions described above may be implemented as a set of program instructions that are stored in a computer readable memory and executed on one or more processors. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of obtaining enhanced resolution from an array of low resolution hazardous material sensors, the method comprising the steps of:
    receiving identification information associated wit an object in a vicinity of a first low resolution hazardous material sensor;
    receiving a first low resolution hazardous material sensor reading from the first low resolution hazardous material sensor;
    receiving proximity information associated with the object, the proximity information being a value of a distance between the object and the hazardous material sensor;
    processing the identification information to determine an identity of the object; and
    correlating the first low resolution hazardous material sensor reading with other low resolution hazardous material sensor readings taken using other low resolution hazardous material sensors at different geographic locations for the same object based on the identity of the object, to obtain a statistically more significant collective sensor reading than may be obtained from one of the individual low resolution hazardous material sensor readings;
    wherein the proximity information is used to weight the hazardous material sensor reading during the step of correlating.

2. The method of claim 1, wherein
    the first low resolution hazardous material sensor reading is inconclusive when taken alone as to whether hazardous material is in the vicinity of the first low resolution hazardous material sensor.

3. The method of claim 1, wherein the identification information comprises video information, and wherein the step of processing the identification information comprises performing facial characteristic recognition on the video information.

4. The method of claim 1, wherein the identification information comprises Radio Frequency Identification (RFID) information and wherein the step of processing the identification information comprises analyzing the RFID information.

5. The method of claim 1, wherein the identification information comprises Infrared signal information, and wherein the step of processing the identification information comprises analyzing an infrared signature associated with the infrared signal information.

6. The method of claim 1, wherein the step of correlating comprises adding the hazardous material sensor reading with the other low resolution hazardous material sensor readings that were taken for the same object using the other low resolution hazardous material sensors placed at the different geographic locations.

7. The method of claim 1, wherein the identity of the object is an assigned identity.

8. The method of claim 1, wherein the identity of the object is an actual identity.

9. The method of claim 1, wherein the step of processing the identification information comprises characterizing the identification information to look for characteristic features of the object, and using these characteristic features to key into a known objects database to determine the identity of the object.

10. The method of claim 1, wherein the identity of the object is a system identity value.

11. The method of claim 1, further comprising the step of raising an alarm if the statistically more significant collective sensor reading provides an indication that the object is likely to be associated with hazardous materials.

* * * * *